J. D. REID.
Bridle-Winker.

No. 161,900.  Patented April 13, 1875.

Witnesses:
John R. Heard
Francis Allen

Inventor:
James D. Reid
by Alban Andrew atty.

THE GRAPHIC CO.PHOTO-LITH.39 & 41 PARK PLACE,N.Y.

UNITED STATES PATENT OFFICE.

JAMES D. REID, OF ST. JOHN, CANADA.

IMPROVEMENT IN BRIDLE-WINKERS.

Specification forming part of Letters Patent No. 161,900, dated April 13, 1875; application filed August 5, 1874.

*To all whom it may concern:*

Be it known that I, JAMES D. REID, of St. John, New Brunswick, Canada, have invented certain new and useful Improvements in Bridle-Winkers; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to improvements in the patent granted to W. and W. F. Boyd on the 26th day of June, 1855, for bridle-winkers, and consists in a winker made of solid leather without any metallic foundation, which winker is pressed between dies, when in a wet or moist state, in such a manner as to leave an ornamental or ribbed outside, although the inside of my improved winker is left perfectly smooth so as not to obstruct or injure the horse's eyes. My invention also consists in coating such a winker, when ready, with a patent-leather coating instead of making the winker of patent-leather at first, which would interfere with and prevent the molding of the outside of the winker. Thus my improved winker is made of leather only, and is not provided with a metallic stiffener, as heretofore has been the case. A winker with a metallic frame to keep it in its proper shape is very liable to get deranged and bent out of shape, when it may come in contact with and obstruct the horse's eyes. The concave shape of the winker that forms the subject of my present invention, allows the horse to use his eyes to look forward and sidewise with the utmost freedom, by which the horse will have more confidence and not get so easily frightened as if his eyes were covered with the ordinary winkers. My improved winker needs no strap or stay to keep it in its proper place, on account of its stiffness and by the flattened extension thereof that is attached to the harness.

Figure 1:
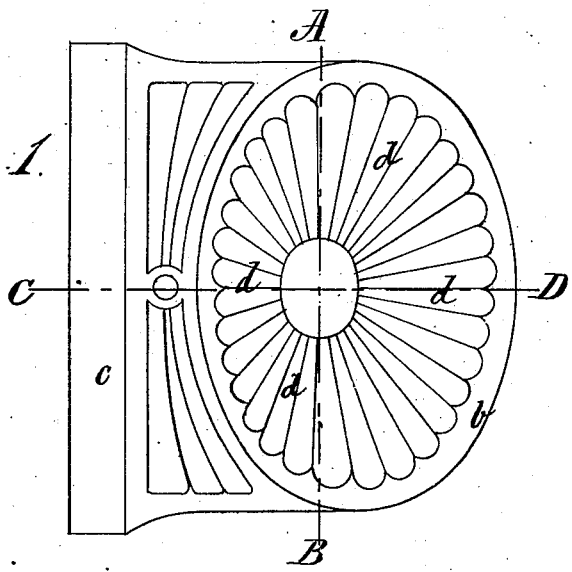
Figure 2:
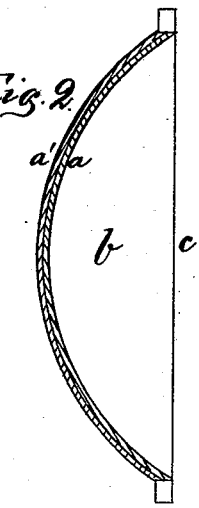
Figure 3:
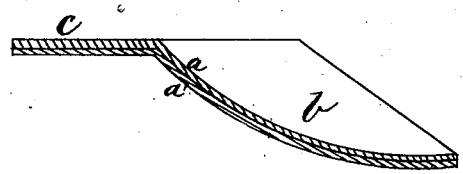

On the drawings, Figure 1 represents a ground plan of my improved winker. Fig. 2 represents a cross-section on the line A B, shown in Fig. 1, and Fig. 3 represents a cross-section on the line C D, also shown in Fig. 1.

Similar letters refer to similar parts wherever they occur on the drawings.

$a$ $a'$ represent different layers of solid leather, of which the winker is composed. These layers are pressed between male and female molds when in a moist condition so as to form a concave cup or shield, $b$, that constitutes the winker, and a flat part, $c$, by means of which the winker is attached to the harness in a suitable manner. The outside of the concave shield $b$ is molded with a suitable ornamentation $d$ $d$ $d$, serving the double purpose of ornament and to give extra strength to the winker. After the winker is thus molded it is coated with a composition similar to what is used on patent-leather, making it very neat and stylish. The winker being concave and provided with the flat part $c$, as shown, prevents it from ever striking the horse's eye, and allows of a more unobstructed view forward and outward for the animal as compared with the common winkers. The molded solid leather winker, as herein shown, will retain its shape under any and all circumstances, and is therefore more desirable than those having a metallic body covered with thin leather.

Having thus fully described the nature and construction of my invention, I wish to secure by Letters Patent, and claim—

A molded solid leather bridle-winker, provided with a concave cup or shield, $b$, ornamented on the outside, but perfectly smooth on the inside, and having the flat part $c$, substantially as and for the purpose set forth.

In testimony that I claim the foregoing as my own invention, I have affixed my signature in presence of two witnesses.

JAMES D. REID.

Witnesses:
ALBAN ANDRÉN,
JOHN R. HEARD.